(12) United States Patent
Kumar

(10) Patent No.: US 11,867,440 B2
(45) Date of Patent: Jan. 9, 2024

(54) WATER-COOLED HEAT EXCHANGER

(71) Applicant: CARRIER CORPORATION, Palm Beach Gardens, FL (US)

(72) Inventor: Munish Kumar, Gurgaon (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 436 days.

(21) Appl. No.: 15/734,491

(22) PCT Filed: May 30, 2019

(86) PCT No.: PCT/US2019/034612
§ 371 (c)(1),
(2) Date: Dec. 2, 2020

(87) PCT Pub. No.: WO2019/232187
PCT Pub. Date: Dec. 5, 2019

(65) Prior Publication Data
US 2021/0231353 A1 Jul. 29, 2021

(30) Foreign Application Priority Data
Jun. 2, 2018 (IN) .............................. 201811020735

(51) Int. Cl.
*F25B 43/02* (2006.01)
*F25B 41/42* (2021.01)
(Continued)

(52) U.S. Cl.
CPC .............. *F25B 43/02* (2013.01); *B01D 29/52* (2013.01); *B01D 35/02* (2013.01); *B01D 35/30* (2013.01);
(Continued)

(58) Field of Classification Search
CPC ...... F25B 43/02; F25B 41/42; F25B 2400/23; B01D 29/52; B01D 35/02; B01D 35/30; B01D 2201/29
(Continued)

(56) References Cited

U.S. PATENT DOCUMENTS 1,641,660 A 9/1927 Bryant
3,822,567 A 7/1974 Kasahara
(Continued)

FOREIGN PATENT DOCUMENTS

CN 101270945 A 9/2008
CN 101960226 A 1/2011
(Continued)

OTHER PUBLICATIONS

International Search Report Application No. PCT/US2019/034612; dated Dec. 5, 2019; pp. 7.
(Continued)

*Primary Examiner* — Madeline Gonzalez
(74) *Attorney, Agent, or Firm* — CANTOR COLBURN LLP

(57) ABSTRACT

An oil separator is provided and includes an exterior shell defining a first interior and first and second openings fluidly communicative with the first interior, a distributor and first and second filter media cartridges. The distributor is integrated within the exterior shell to define a second interior within the first interior, has a length, which is slightly less than that of the exterior shell, being disposed to define opposite spaces between opposites ends thereof and opposite ends of the exterior shell and is sealed to the exterior shell along the length to form first and second passageways from the first opening to the opposite spaces. The first and second filter media cartridges are disposed within the first interior between the opposite spaces and the second opening.

18 Claims, 4 Drawing Sheets

(51) Int. Cl.
  *B01D 35/02* (2006.01)
  *B01D 35/30* (2006.01)
  *B01D 29/52* (2006.01)

(52) U.S. Cl.
  CPC .......... *F25B 41/42* (2021.01); *B01D 2201/29* (2013.01); *F25B 2400/23* (2013.01)

(58) Field of Classification Search
  USPC ....... 210/767, 186, 175, 247, 314, 335, 455, 210/456, 437, 438, 439
  See application file for complete search history.

(56) References Cited

U.S. PATENT DOCUMENTS

| | | | |
|---|---|---|---|
| 4,668,393 A * | 5/1987 | Stone | .................... B01D 21/10 210/493.4 |
| 5,704,215 A | 1/1998 | Lord et al. | |
| 6,158,503 A | 12/2000 | Gille et al. | |
| 6,276,165 B1 | 8/2001 | Nishijima et al. | |
| 7,810,351 B2 | 10/2010 | Westermeyer | |
| 2011/0000243 A1 | 1/2011 | Jabbour et al. | |
| 2011/0041528 A1 | 2/2011 | Charbel et al. | |
| 2012/0037554 A1 | 2/2012 | Sakano et al. | |
| 2016/0025416 A1 | 1/2016 | Pitts et al. | |
| 2016/0201991 A1 | 7/2016 | Esformes et al. | |
| 2020/0248940 A1 | 8/2020 | Liu et al. | |

FOREIGN PATENT DOCUMENTS

| | | |
|---|---|---|
| CN | 101960238 A | 1/2011 |
| CN | 102345944 A | 2/2012 |
| CN | 103398512 A | 11/2013 |
| CN | 104596162 A | 5/2015 |
| CN | 105164488 A | 12/2015 |
| CN | 205279550 U | 6/2016 |
| CN | 107062709 A | 8/2017 |
| CN | 107940833 A | 4/2018 |
| EP | 1293736 A1 | 3/2003 |
| EP | 3327376 A1 | 5/2018 |
| JP | 2001263872 A | 9/2001 |
| JP | 2004308968 A | 11/2004 |
| JP | 2004347158 A | 12/2004 |
| KR | 20020087179 A | 11/2002 |
| KR | 101385194 B1 | 4/2014 |
| WO | 2016198907 A1 | 12/2016 |

OTHER PUBLICATIONS

Written Opinion Application No. PCT/US2019/034612; dated Dec. 5, 2019; pp. 8.

Office Action issued in Chinese Application No. 201980037010.3; Application Filing Date May 30, 2019; dated Feb. 18, 2022 (13 pages).

* cited by examiner

WATER-COOLED HEAT EXCHANGER

BACKGROUND

The following description relates to water-cooled heat exchangers and, more specifically, water-cooled heat exchangers with an oil separator having integrated refrigerant distribution.

A chiller is a machine that removes heat from a liquid via a vapor-compression or absorption refrigeration cycle. This liquid can then be circulated through a heat exchanger to cool equipment, or another process stream (such as air or process water). As a necessary by product, refrigeration creates waste heat that must be exhausted to ambience, or for greater efficiency, recovered for heating purposes.

In current chillers, two copper pipes are used to connect compressor discharge flows with both ends of an oil separator. Silver content brazing is used to assemble dissimilar materials at each of the multiple connections.

BRIEF DESCRIPTION

According to an aspect of the disclosure, an oil separator is provided and includes an exterior shell defining a first interior and first and second openings fluidly communicative with the first interior, a distributor and first and second filter media cartridges. The distributor is integrated within the exterior shell to define a second interior within the first interior, has a length, which is slightly less than that of the exterior shell, being disposed to define opposite spaces between opposites ends thereof and opposite ends of the exterior shell and is sealed to the exterior shell along the length to form first and second passageways from the first opening to the opposite spaces. The first and second filter media cartridges are disposed within the first interior between the opposite spaces and the second opening.

In accordance with additional or alternative embodiments, the exterior shell includes a flat side, a curved side protruding away from the flat side and opposite end walls at respective opposite ends of the flat and curved sides.

In accordance with additional or alternative embodiments, the distributor includes a base and sidewalls extending from opposite edges of the base toward the curved side.

In accordance with additional or alternative embodiments, seals are provided between the sidewalls and the curved side.

In accordance with additional or alternative embodiments, the exterior shell has a semi-circular cross-sectional shape.

In accordance with additional or alternative embodiments, the distributor is offset from a center of the exterior shell.

In accordance with additional or alternative embodiments, the distributor has at least one of a trapezoidal, semi-circular or rectangular cross-section.

In accordance with additional or alternative embodiments, the distributor has an over-arching cross-section.

In accordance with additional or alternative embodiments, the first and second filter media cartridges have substantially semi-circular cross-sectional shapes and are formed to define cut-out portions for the distributor.

According to an aspect of the disclosure, a filter media cartridge of an oil separator having a first cross-sectional shape and an integrated distributor disposed within the oil separator and having a second cross-sectional shape is provided. The filter media cartridge includes filter media, a housing body configured to securably house the filter media and sized to tightly fit within the oil separator, the housing body having a third cross-sectional shape substantially similar to the first cross-sectional shape and formed to define a cut-out portion, the cut-out portion having a fourth cross-sectional shape substantially similar to the second cross-sectional shape and corresponding in location to the integrated distributor.

In accordance with additional or alternative embodiments, the filter media includes a mesh.

In accordance with additional or alternative embodiments, the seals are disposed along the cut-out portion.

In accordance with additional or alternative embodiments, the third cross-sectional shape includes a curved side and the fourth cross-sectional shape is at least one of trapezoidal, semi-circular or rectangular.

According to an aspect of the disclosure, a chiller assembly is provided and includes a compressor, an oil separator and a single discharge pipe sub-assembly fluidly interposed between the compressor and the oil separator. The oil separator includes an exterior shell and a distributor integrated within the exterior shell. The distributor has a cross-sectional area which is substantially similar to that of the single discharge pipe sub-assembly.

In accordance with additional or alternative embodiments, the single discharge pipe sub-assembly includes steel.

In accordance with additional or alternative embodiments, the single discharge pipe sub-assembly includes a weld joint at the oil separator.

In accordance with additional or alternative embodiments, the exterior shell defines a first interior and first and second openings fluidly communicative with the first interior, the distributor is integrated within the exterior shell to define a second interior within the first interior and has a length, which is slightly less than that of the exterior shell, is disposed to define opposite spaces between opposites ends thereof and opposite ends of the exterior shell and is sealed to the exterior shell along the length to form first and second passageways from the first opening to the opposite spaces and first and second filter media cartridges are disposed within the first interior between the opposite spaces and the second opening.

In accordance with additional or alternative embodiments, seals are disposed between the distributor and the exterior shell.

In accordance with additional or alternative embodiments, the exterior shell has a semi-circular cross-sectional shape and the distributor has at least one of a trapezoidal, semi-circular or rectangular cross-section.

In accordance with additional or alternative embodiments, the first and second filter media cartridges have substantially semi-circular cross-sectional shapes and are formed to define cut-out portions for the distributor.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

These and other advantages and features will become more apparent from the following description taken in conjunction with the drawings.

DETAILED DESCRIPTION

As will be described below, an integrated oil separator is provided with a distributor such that refrigerant distribution occurs within the oil separator. Refrigerant will flow from a discharge pipe of a compressor into one port of the oil separator, which is integrated with a heat exchanger shell. From there, an internal distributor will distribute the refrigerant into both ends of the oil separator. The distributor internal cross-section size will be equal to the discharge pipe size so that the integrated oil separator will induce no additional pressure drop or change in thermal properties of the refrigerant. The integrated oil separator assembly with the compressor will also be characterized in that copper pipes of conventional chillers will be replaced with a steel pipe. Similarly, silver brazing process that are used with conventional assemblies will be replaced with welding.

Figure 1:
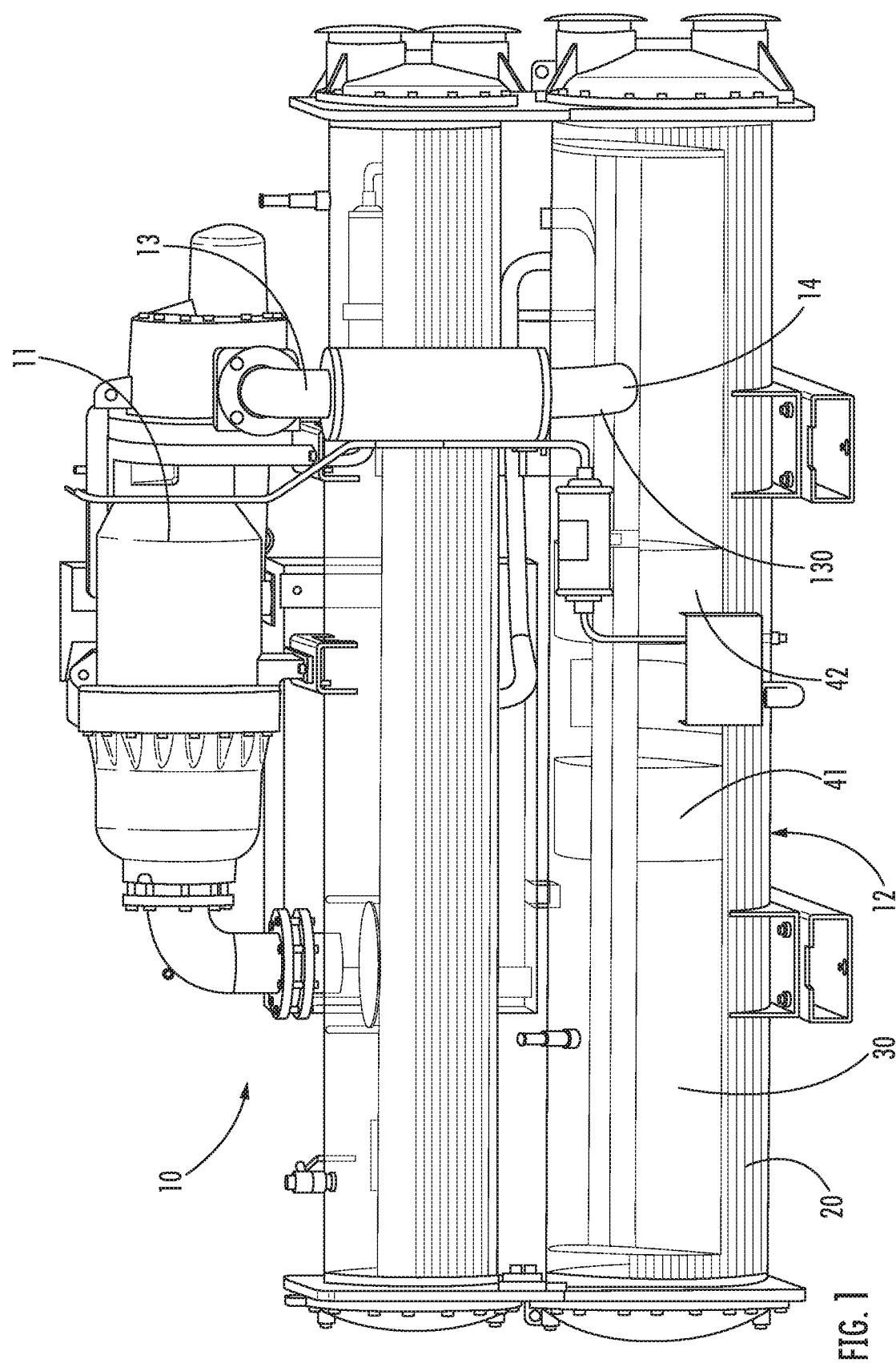
FIG. 1 is a side view of a chiller assembly in accordance with embodiments.

With reference to FIG. 1, a chiller assembly 10 is provided. The chiller assembly 10 includes a compressor 11, an oil separator 12 and a single discharge pipe sub-assembly 13. The compressor 11 is configured to compress refrigerant and to discharge the compressed refrigerant at an initial pressure to the single discharge pipe sub-assembly 13. The single discharge pipe sub-assembly 13 is fluidly interposed between the compressor 11 and the oil separator 12 and conveys the compressed refrigerant at the initial pressure from the compressor 11 to the oil separator 12. The single discharge pipe sub-assembly 13 may be formed of steel or other similar or suitable materials and includes a weld joint 14 at an interface between an end 130 thereof and the oil separator 12.

Figure 2:
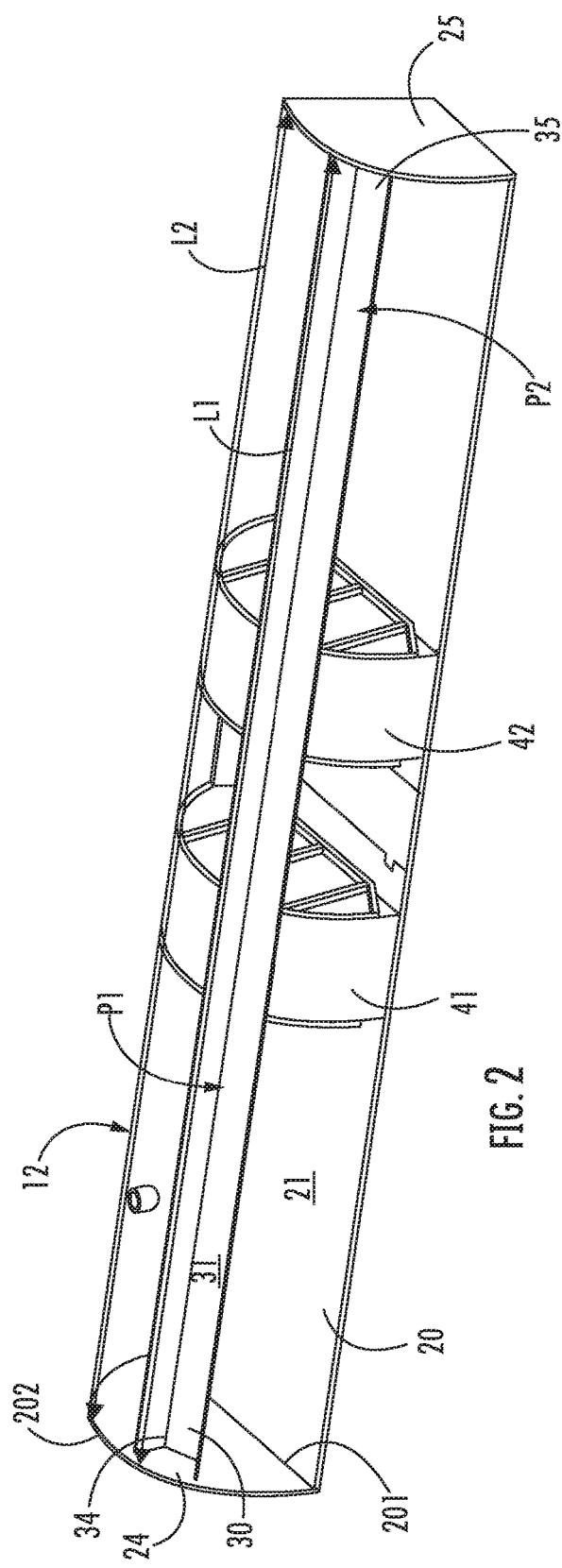
FIG. 2 is a perspective view of an oil separator and an integrated distributor of the chiller assembly of FIG. 1 in accordance with embodiments.
Figure 3:
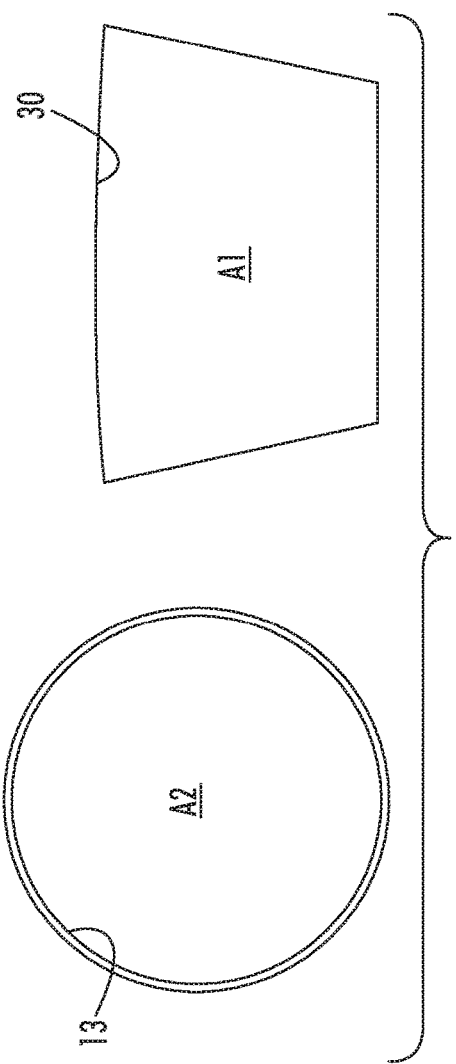
FIG. 3 is a comparative view of cross-sectional areas of a single discharge pipe sub-assembly of the chiller assembly and the distributor integrated into the oil separator.

As shown in FIG. 1 and with additional reference to FIGS. 2 and 3, the oil separator 12 includes an exterior shell 20, a distributor 30 and first and second filter media cartridges 41 and 42. The distributor 30 is integrated within the exterior shell 20 and, as shown in FIG. 3, has a cross-sectional area A1 which is substantially similar to the cross-sectional area A2 of the single discharge pipe sub-assembly 13.

Figure 5:
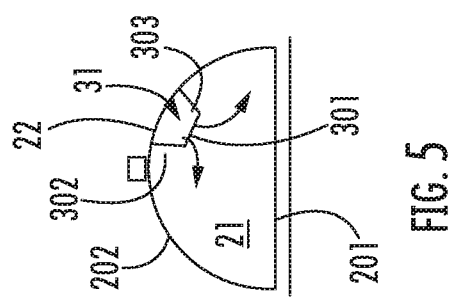
FIG. 5 is an axial view of the oil separator and the integrated distributor of FIG. 2.
Figure 4:
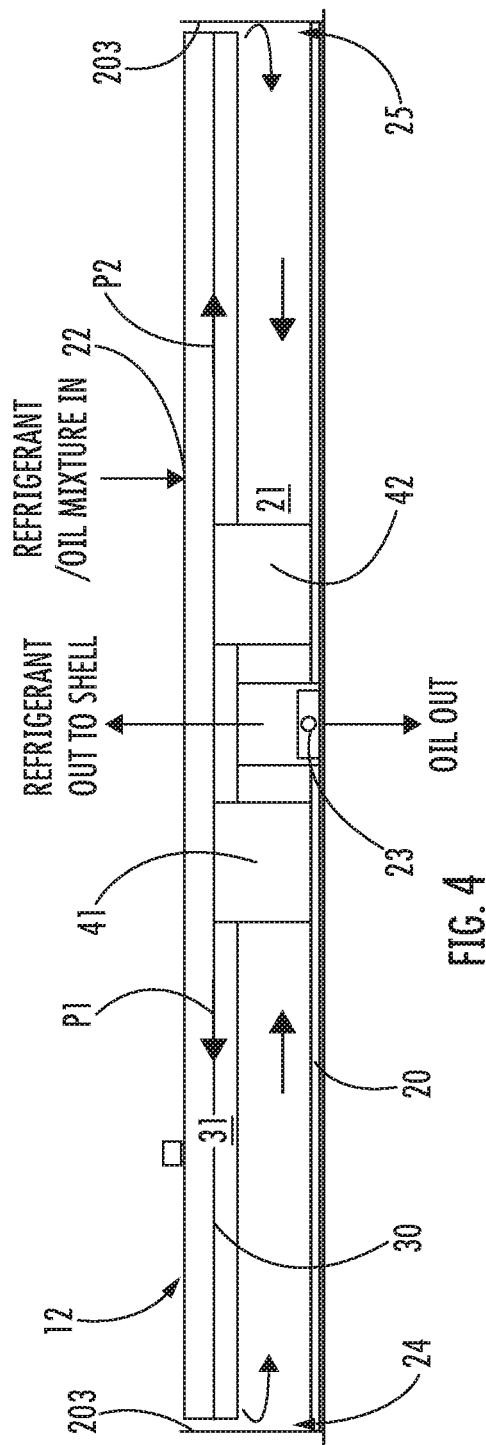
FIG. 4 is a side view of the oil separator and the integrated distributor of FIG. 2.

With continued reference to FIG. 2 and with additional reference to FIGS. 4 and 5, the exterior shell 20 is formed to define a first interior 21, a first opening 22, which is fluidly communicative with the first interior 21 and a second opening 23, which is also fluidly communicative with the first interior 21. The distributor 30 is integrated within the exterior shell 20 to define a second interior 31 within the first interior 21.

The distributor 30 has a longitudinal length L1, which is slightly less than a longitudinal length L2 of the exterior shell 20. The distributor 30 is disposed within the exterior shell 20 to thus define opposite spaces 32, 33 (see FIG. 4) between opposites ends 34, 35 of the distributor 30 and corresponding opposite ends 24, 25 of the exterior shell 20. The distributor 30 is also sealed to the exterior shell 20 by seals 50 (se FIG. 6) that extend along the edges of the distributor 30 along an entirety of the length L1. The distributor 30 thus forms first and second passageways P1 and P2 from the first opening 22 to the opposite spaces 32, 33. The first and second filter media cartridges 41, 42 are respectively disposed within the first interior 21 between corresponding ones of the opposite spaces 32, 33 and the second opening 23.

In accordance with embodiments, the exterior shell 20 may have a substantially semi-circular cross-sectional shape and may include a flat side 201, a curved side 202 that protrudes away from the flat side 201 and opposite end walls 203. The opposite end walls 203 are provided at respective opposite ends of the flat side 201 and the curved side 202. The flat side 201, the curved side 202 and the opposite end walls 203 cooperatively define the first interior 21. The distributor 30 may have a substantially trapezoidal shape (with the curved side 202) serving as one of the trapezoidal sides or other similar shapes to be described in greater detail below. The distributor 30 may include a base 301, sidewalls 302, 303 that extend in a same direction from opposite edges of the base 301 and the seals 50. The distributor 30 is disposed within the first interior 21 at an offset position relative to a mid-line of the exterior shell 20 (see FIG. 5) such that the sidewalls 302, 303 extend in the same direction from the opposite edges of the base 301 toward an interior surface of the curved side 202 of the exterior shell 20. The seals 50 may be sealably interposed between distal edges of the sidewalls 302, 303 and the interior surface of the curved side 202.

Respective widths of the sidewalls 302, 303 dispose the base 301 at a depth (see FIG. 5) from the interior surface of the curved side 202. The base 301, the sidewalls 302, 303 and the curved side 202 thus define the second interior 31 such that the second interior 31 and the distributor 30 effectively has the cross-sectional area A1.

As shown in FIGS. 4 and 5, fluid received by the oil separator 12 includes a mixture of refrigerant and oil that was compressed in the compressor 11 and conveyed to the oil separator 12 through the single discharge pipe sub-assembly 13. The fluid enters the exterior shell 20 via first opening 22 and is contained within the second interior 31 by the seals 50 (see FIG. 6). The fluid thus moves through either the first or the second passageways P1 and P2 within the second interior 31 and along the length L1 of the distributor 30 as the seals 50 prevent the fluid from flowing in any other direction. Once the fluid that has moved through either the first passageway P1 or the second passageway P2, the fluid reaches the opposite spaces 32, 33. The fluid then passes through the opposite spaces 32, 33 and turns back into the first interior 21 due to interactions with the opposite end walls 203 and flows through the first and second filter media cartridges 41, 42 toward the second opening 23.

Due to the cross-sectional area A1 of the distributor 30 being substantially similar to the cross-sectional area A2 of the single discharge pipe sub-assembly 13, fluid moving through the single discharge pipe sub-assembly 13 at the initial pressure moves through the distributor 30, the opposite spaces 32, 33 and into the first interior 21 without experiencing a pressure drop. That is, the fluid passes through the opposite spaces 32, 33 at substantially a same pressure as the initial pressure.

Figure 6:
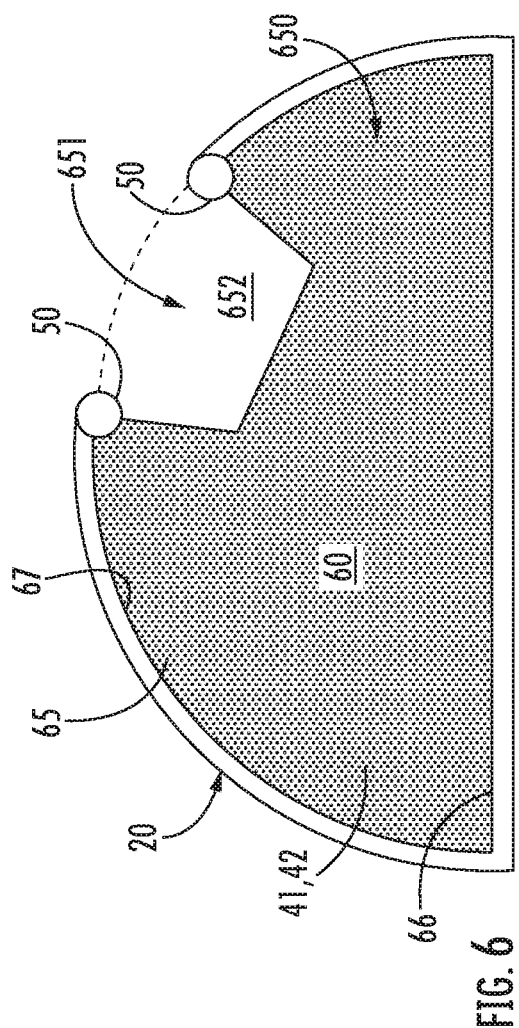
FIG. 6 is an axial view of a filter media cartridge in accordance with embodiments.

With reference to FIG. 6, the first and second filter media cartridges 41, 42 are provided for use with the oil separator 12 as described above. As shown in FIG. 6, each of the first and second filter media cartridges include filter media 60, such as a mesh, that is porous to refrigerant and oil mixtures, and a housing body 65. The housing body 65 is configured to securably house the filter media 60 and is sized to tightly fit within the exterior shell 20 and around the distributor 30 inside the oil separator 12. The housing body 65 includes a flat side 66 and a curved side 67 and has a cross-sectional shape 650 substantially similar to the cross-sectional shape of the exterior shell 20 and is formed to define a cut-out portion 651. The cut-out portion 651 runs along the base 301, the sidewalls 302, 303 and the seals 50 and has a cross-sectional shape 652 that is substantially similar to the cross-sectional shape of the distributor 30 and corresponds in location to the distributor 30 relative to the exterior shell 30. The first and second filter media cartridges 41, 42 occupy an entire cross-sectional area of the exterior shell 20 but for the cross-sectional area of the distributor 30.

Figure 7:
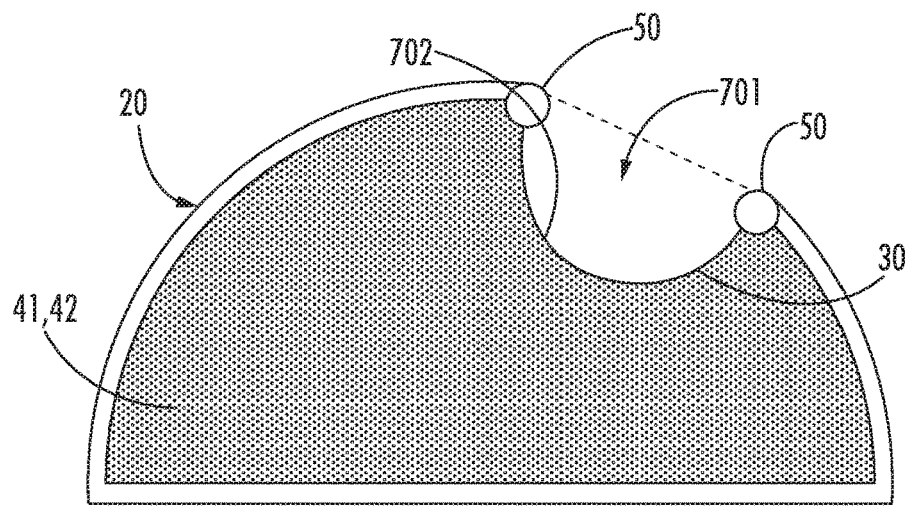
FIG. 7 is an axial view of a filter media cartridge and an exterior shell and a distributor of an oil separator in accordance with embodiments.
Figure 8:
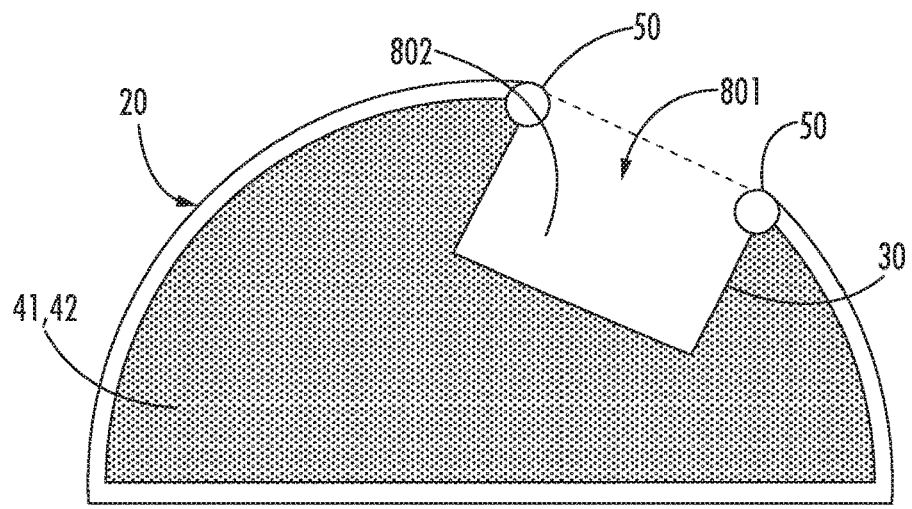
FIG. 8 is an axial view of a filter media cartridge and an exterior shell and a distributor of an oil separator in accordance with embodiments.
Figure 9:
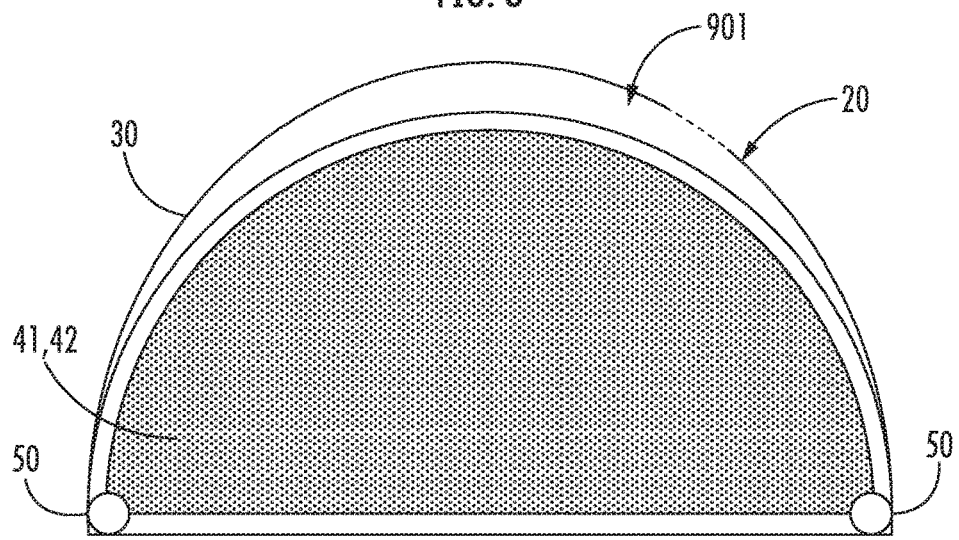
FIG. 9 is an axial view of a filter media cartridge and an exterior shell and a distributor of an oil separator in accordance with embodiments.

With reference to FIGS. 7-9, further and/or alternative cross-sectional shapes of the distributor 30 and the filter media cartridges 41, 42 are illustrated. As shown in FIG. 7, the distributor 30 can have a semi-circular or rounded cross-sectional shape 701 with the filter media cartridges 41, 42 defining similarly semi-circular or rounded cut-out portions 702. As shown in FIG. 8, the distributor 30 can have a rectangular or squared shape 801 with the filter media cartridges 41, 42 defining similarly rectangular or squared cut-out portions 802. As shown in FIG. 9, the distributor 30 can have an over-arching cross-sectional shape 901. Here, the distributor 30 lies over and surrounds the semi-circular exterior shell 20 and the filter media cartridges 41, 42, which, in this case, do not require cut-out portions to accommodate the distributor 30.

Technical effects and benefits of the present disclosure are an ease of manufacturing for the chiller assembly (i.e., one welded joint vs. many copper-copper joints as well as copper-steel brazed joints) and an ease of manufacturing of the internal distributor, which requires no particular tooling. In addition, unlike discharge pipes which have high interior pressures and a need for thick pipe material, internal distributor material thicknesses can be as low as 2 mm. This is due to the fact that there will not be one sided high pressures applied thereto but rather an internal part of an oil separator where both sides of the distributor will have same pressures applied thereto.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. An oil separator, comprising:
    an exterior shell comprising a flat side and a curved side protruding away from the flat side and defining a first interior and first and second openings fluidly communicative with the first interior;
    a distributor integrated within the exterior shell to define a second interior within the first interior,
    the distributor comprising a base and sidewalls extending from opposite edges of the base toward the curved side and having a length, which is slightly less than that of the exterior shell, being disposed to define opposite spaces between opposites ends thereof and opposite ends of the exterior shell and being sealed to the exterior shell along the length to form first and second passageways from the first opening to the opposite spaces; and
    first and second filter media cartridges disposed within the first interior between the opposite spaces and the second opening.

2. The oil separator according to claim 1, wherein the exterior shell further comprises opposite end walls at respective opposite ends of the flat and curved sides.

3. The oil separator according to claim 1, further comprising seals between the sidewalls and the curved side.

4. The oil separator according to claim 1, wherein the exterior shell has a semi-circular cross-sectional shape.

5. The oil separator according to claim 4, wherein the distributor is offset from a center of the exterior shell.

6. The oil separator according to claim 4, wherein the distributor has at least one of a trapezoidal, semi-circular or rectangular cross-section.

7. The oil separator according to claim 1, wherein the distributor has an over-arching cross-section.

8. The oil separator according to claim 1, wherein the first and second filter media cartridges have substantially semi-circular cross-sectional shapes and are formed to define cut-out portions for the distributor.

9. A filter media cartridge for the oil separator according to claim 1 having a first cross-sectional shape and the distributor disposed within the oil separator and having a second cross-sectional shape, the filter media cartridge comprising:
    filter media;
    a housing body configured to securably house the filter media and sized to tightly fit within the oil separator,
    the housing body having a third cross-sectional shape substantially similar to the first cross-sectional shape and formed to define a cut-out portion,
    the cut-out portion having a fourth cross-sectional shape substantially similar to the second cross-sectional shape and corresponding in location to the distributor.

10. The filter media cartridge according to claim 9, wherein the filter media comprises a mesh.

11. The filter media cartridge according to claim 9, further comprising seals disposed along the cut-out portion.

12. The filter media cartridge according to claim 9, wherein the third cross-sectional shape comprises a curved side and the fourth cross-sectional shape is at least one of trapezoidal, semi-circular or rectangular.

13. A chiller assembly, comprising:
    a compressor;
    the oil separator of claim 1; and
    a single discharge pipe sub-assembly fluidly interposed between the compressor and the oil separator, the distributor having a cross-sectional area which is substantially similar to that of the single discharge pipe sub-assembly.

14. The chiller assembly according to claim 13, wherein the single discharge pipe sub-assembly comprises steel.

15. The chiller assembly according to claim 13, wherein the single discharge pipe sub-assembly comprises a weld joint at the oil separator.

16. The chiller assembly according to claim 13, further comprising seals disposed between the distributor and the exterior shell.

17. The chiller assembly according to claim 13, wherein the exterior shell has a semi-circular cross-sectional shape and the distributor has at least one of a trapezoidal, semi-circular or rectangular cross-section.

18. The chiller assembly according to claim 13, wherein the first and second filter media cartridges have substantially semi-circular cross-sectional shapes and are formed to define cut-out portions for the distributor.

* * * * *